United States Patent [19]
Gaudet et al.

[11] Patent Number: 4,498,150
[45] Date of Patent: Feb. 5, 1985

[54] DOCUMENT AUTOMATIC PAGINATION

[75] Inventors: James L. Gaudet; Rudolph E. Chukran, both of Austin, Tex.

[73] Assignee: International Business Machines Corporation, Armonk, N.Y.

[21] Appl. No.: 554,611

[22] Filed: Nov. 23, 1983

Related U.S. Application Data

[63] Continuation of Ser. No. 274,364, Jun. 16, 1981, abandoned.

[51] Int. Cl.³ .............................................. G06F 3/12
[52] U.S. Cl. ..................................... 364/900; 400/62; 400/64
[58] Field of Search ... 364/200 MS File, 900 MS File; 400/62, 70, 76, 710, 61, 64, 67, 68

[56] References Cited

U.S. PATENT DOCUMENTS

| | | | |
|---|---|---|---|
| 3,844,395 | 10/1974 | Mero et al. | 400/70 |
| 3,892,427 | 7/1975 | Kraynak et al. | 400/70 |
| 3,930,570 | 1/1976 | Fletcher | 400/70 |
| 3,981,383 | 9/1976 | Bittner et al. | 400/64 |
| 4,051,459 | 9/1977 | Steranko et al. | 364/900 |
| 4,086,660 | 4/1978 | McBride | 364/900 |
| 4,189,727 | 2/1980 | Vaughn, Jr. | 364/900 |
| 4,220,417 | 9/1980 | Sprott et al. | 364/900 |
| 4,240,758 | 12/1980 | Acosta | 364/900 |
| 4,264,217 | 4/1981 | De Sieno | 364/900 |
| 4,282,583 | 8/1981 | Khan et al. | 364/900 |
| 4,311,399 | 1/1982 | Wegryn et al. | 400/64 |
| 4,353,298 | 10/1982 | Baker et al. | 364/900 |
| 4,381,553 | 4/1983 | Ferguson | 364/900 |

OTHER PUBLICATIONS

*IBM Technical Disclosure Bulletin*, "Receiving Text with On-Line Control Formats on an IBM Information Processor", Boyd et al., vol. 22, No. 5, 1979.

*Primary Examiner*—Jerry Smith
*Assistant Examiner*—Gary V. Harkcom
*Attorney, Agent, or Firm*—Harold E. Meier

[57] ABSTRACT

The specification discloses a method for automatically paginating a data stream in a word processing system. A vertical tracking register is incremented by a value representing the displacement of the vertical print position when a line end code is encountered. The page overflow latch is then interrogated to determine whether a page overflow condition has occurred. If a page overflow condition has occurred, the next character in the data stream following a line end code is interrogated to determine whether the character is a graphic character. If the character is a graphic character, a page end code is copied into the output buffer ahead of the graphic character, the page overflow latch is reset and the tracking register is initialized. The tracking register value is then interrogated to determine whether it exceeds the last typing line. If the last typing line value has been exceeded, the page overflow latch is set. The page overflow latch is subsequently interrogated to determine whether a page overflow condition exists. If not, the input character is copied from the input buffer to the output buffer.

10 Claims, 8 Drawing Figures

FIG. 8

DOCUMENT AUTOMATIC PAGINATION

This is a continuation of application Ser. No. 274,364 filed June 16, 1981 now abandoned.

BACKGROUND OF THE INVENTION

1. Field of the Invention

The present invention pertains to word processing and more particularly to automatic pagination of text data streams.

2. Description of Prior Art

In most word processing systems currently in use, the operator cannot perform batch/background output functions such as print, magnetic card recording or communications without prior page adjustment. While some systems, such as the IBM Office System 6, use end of paper sensors to cause formated pages to be printed, these systems do not follow the boundaries of the document. Moreover, in the Office System 6, formated pages are not created for other batch/background processes such as magnetic card recording or communications. Accordingly, a method for automatically paginating the data stream for batch/background output processes is needed.

SUMMARY OF THE INVENTION

In accordance with the present invention, a method is provided for automatically paginating a data stream in a word processing system. A vertical tracking register is incremented by a value representing the displacement of the vertical print position when a line end code is encountered. A page overflow latch is interrogated to determine whether a page overflow condition has occurred. If a page overflow condition has occurred, the next character in the data stream following a line end code is interrogated to determine whether the character is a graphic character. If the character is a graphic character, a page end code is copied into the output buffer ahead of the graphic character, the page overflow latch is reset and the tracking register is initialized. The tracking register value is then interrogated to determine whether it exceeds the last typing line value. If the last typing line value has been exceeded, the page overflow latch is set. The page overflow latch is subsequently interrogated to determine whether a page overflow condition exists. If not, the input character is copied from the input buffer to the output buffer.

BRIEF DESCRIPTION OF THE DRAWINGS

For a more complete understanding of the present invention and for further objects and advantages thereof, reference is now made to the following Detailed Description taken in conjunction with the accompanying Drawings in which.

BEST MODE FOR CARRYING OUT THE INVENTION

The present invention provides preprocessing automatic pagination for a data stream for batch/background processes such as magnetic card recording, printing and communications between word processors. The primary object is to provide a word processor with the capability of printing a data stream that has not been paginated, i.e., provided with page end codes. Automatic pagination permits the operator to key in a logical page of any length without having the printed text exceed the physical boundaries of the paper or the last typing line specified by the operator.

The method of automatic pagination of the present invention recognizes and handles three categories of nonpaginated text, as well as text which has been paginated with the insertion of page end codes. The first category includes text in which the logical page end occurs before the last typing line on the paper. A logical page is a series of lines of text stored on the diskette by the operator and terminated by a page end code. A logical page may correspond to the lines of a physical sheet of paper or may be greater or less than the number of lines on a sheet of paper. When the logical page end occurs before the last typing line, the entire document can be printed without exceeding the physical boundaries of the paper. Thus, no automatic pagination is required.

The second and third categories include documents in which the data stream making up the logical page would exceed the last typing line if printed. This causes a page overflow condition. In the second category, the logical page exceeds the last typing line, but the next character in the data stream is a control code which causes blank spaces. These control codes are known as "white space characters" and include, for example, line end codes, page end codes, paragraph boundaries, tabs and carriage returns. In this case, a new page will not be created until the first nonwhite (graphic) character in the data stream is encountered.

In the third category, the logical page exceeds the last typing line and the next character in the data stream is a nonwhite or graphic character. This causes an error condition since printing of the next character in the data stream would cause text to be printed below the last typing line. In this case, the page is terminated at the point in the data stream where the program originally determined that the last typing line was exceeded and a new page is started with the first line containing the printable graphic. When this overflow-error condition occurs, the program goes back and inserts a page end code after the point where the last line was exceeded, thereby paginating the revised data stream, which is subsequently processed.

Figure 1:
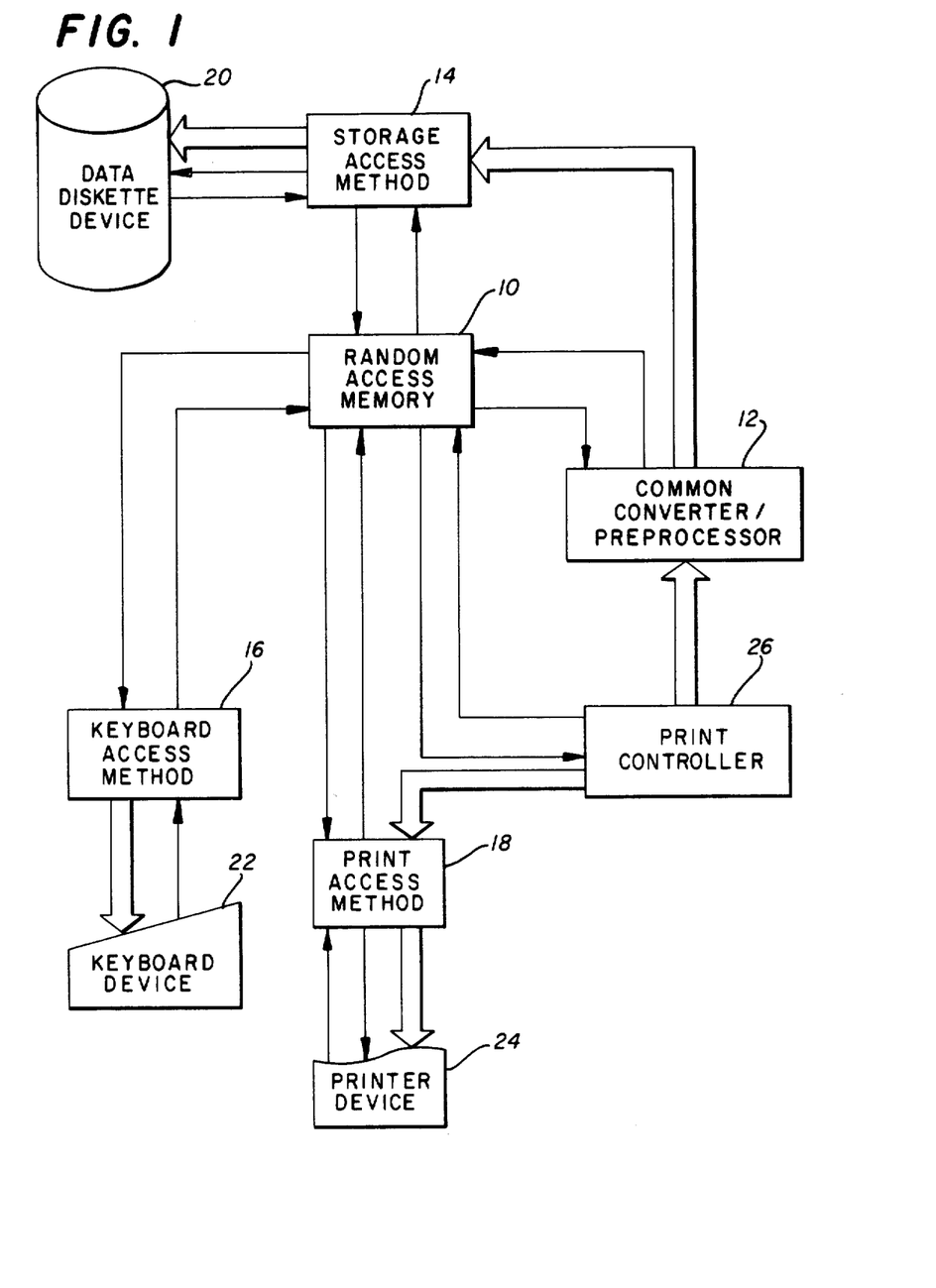
FIG. 1 is a block diagram of the functional units of a word processing system which relate to the present invention.

FIG. 1 shows the various functional components of a word processing system which are involved in automatic pagination. The single line arrows represent the flow of data; the double line arrows represent the flow of control. The components include a random access memory 10, a common converter/preprocessor 12, storage access method 14, keyboard access method 16 and print access method 18, as well as various peripheral devices such as a data diskette device 20, a keyboard device 22 and printer device 24. In addition, a print control 26 is provided which interfaces with memory 10, converter 12 and print access method 18.

Figure 2:
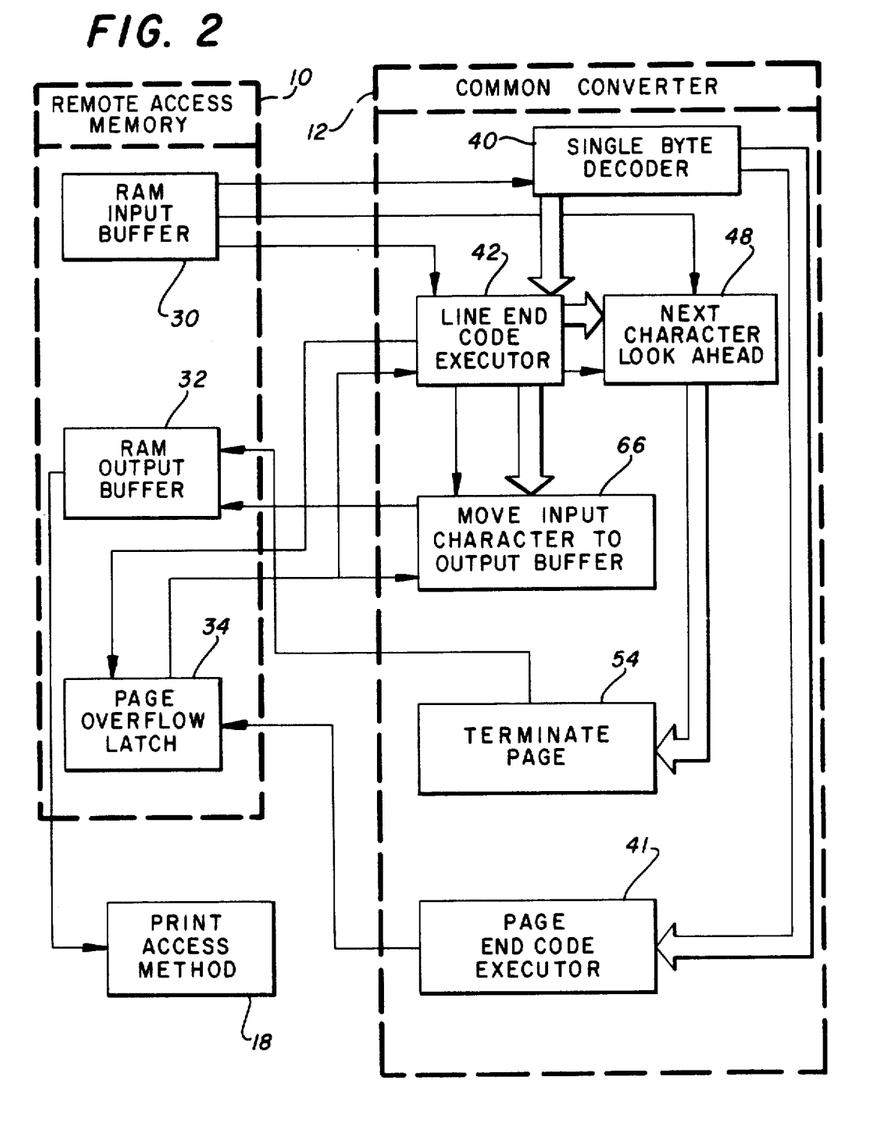
FIG. 2 is a block diagram showing the functional units of the common converter/preprocessor, the remote access memory and the printer access method illustrated in FIG. 1.

Random access memory 10 contains an input buffer 30, output buffer 32 and a binary page overflow latch 34 (FIG. 2). As shown in FIG. 1, memory 10 interfaces with the common converter/preprocessor 12, storage access method 14, keyboard access method 16, print access method 18 and print controller 26.

Common converter/preprocessor 12 is an interface between the internal diskette code set and code sets used by the external printer, magnetic card recording and communication access methods. The primary function of the common converter/preprocessor is to convert the internal diskette code into a printable data stream. This preprocessing function takes the internal EBCDIC code set and generates a simple subset in EBCDIC, which can then be used and/or translated by specific access methods. As shown in FIG. 1 and in greater detail in FIG. 2, converter 12 takes data from the input buffer 30 of random access memory 10, operates on it and provides a revised data stream to the output buffer 32. The revised data stream, which includes page end codes provided by the present invention, is accessed from output buffer 32 by print access method 18. The relevant subfunctions of common converter 12 are shown in FIG. 2 and are described below in greater detail.

Referring again to FIG. 1, storage access method 14 is a collection of programs which is used to interface various components of the system to the data diskette device 20. Whenever in the process of acquiring an input data stream converter 12 makes a request, storage access method 14 requests the data from the diskette and places it in memory in input buffer 30 (FIG. 2), where it can be accessed for preprocessing by converter 12.

The keyboard access method 16 is a collection of programs which interface with the keyboard device 22 from which the operator keys the primary input. The keyboard 22 has indirect control of the printing process through the memory 10. Once the operator initiates the action via keyboard 22, the action completes itself under control of the print controller 26 and no further operator interaction is required.

The print access method 18 is a set of programs which interface to the printer device 24. Print access method 18 takes data converted by common converter 12, puts it back into memory 10 and sends it to the printer device 24 under the control of print controller 26.

FIG. 2 shows five subfunctions of the common converter/preprocessor which relate to the present invention. These include the single byte decoder, page end code executor, line end code executor, next character look ahead, terminate page and move input character to output buffer functions. These subfunctions are shown in FIGS. 3-8 and described below in greater detail.

Figure 3:
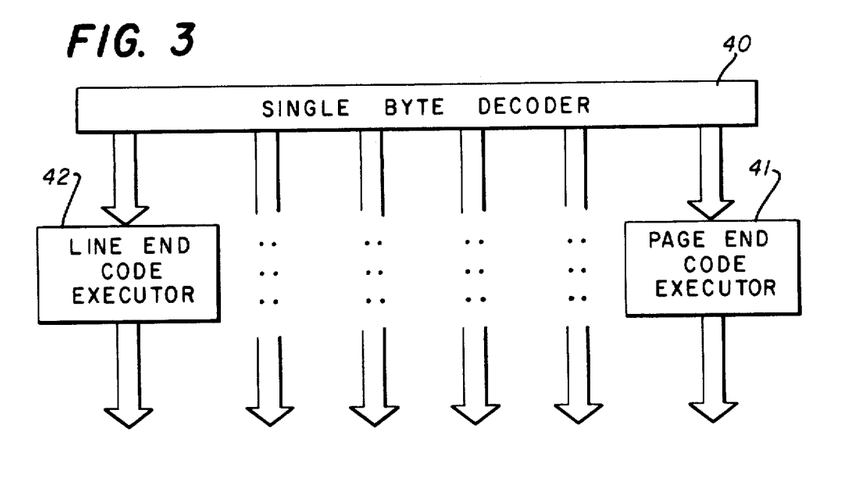
FIG. 3 is a flow chart showing the flow of control from the single byte decoder to the page end code executor and line end code executor.

The single byte control decoder 40 shown in FIG. 2 is at the top of the hierarchy in terms of the flow of control. Decoder 40 decodes all single byte control codes, of which only the line end codes and page end codes are of interest here. As shown in FIGS. 2-3, decoder 40 passes control either to the page end code executor 41 or to the line end code executor 42 when the appropriate page or line end codes are encountered in the data stream. As shown in FIG. 3, other nonline end codes, including graphic character codes, are also decoded by decoder 40, but these codes are not directly germane to the present invention. Accordingly, the logic which decodes this data into the revised data stream is not shown or described. Decoder 40 transfers control to other subfunctions, not illustrated in FIG. 3, which obtain ordinary nonline end codes from the input buffer, process and copy it into the output buffer 32.

Figure 4:
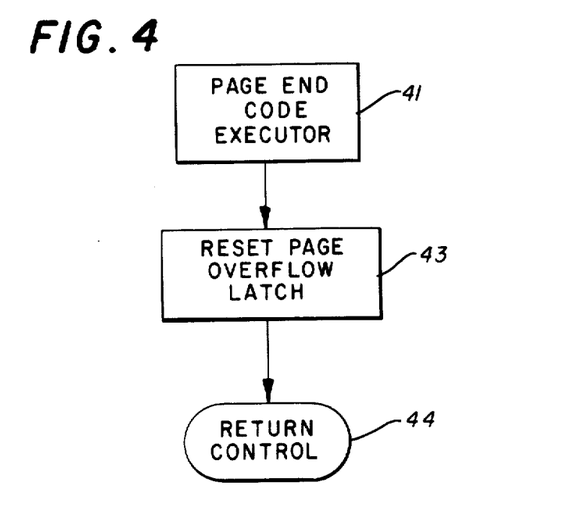
FIG. 4 is a flow chart of the logic of the Page End Code Executor Subroutine.

Since the Page Adjustment Routine does not distinguish between text which has been paginated and text which has not, it must be capable of handling text in which a page end code is encountered. When single byte control decoder 40 decodes a page end code, no automatic pagination is necessary and the Automatic Pagination Routine is bypassed. When this occurs, decoder 40 transfers control to page end code executor 41. The logic of subroutine 41 is shown in FIG. 4. At step 43, the page overflow latch 34 is reset to prevent the possibility of a page overflow condition when a page end code is already present. Control is then returned to a higher level program (not shown) at step 44.

Figure 5:
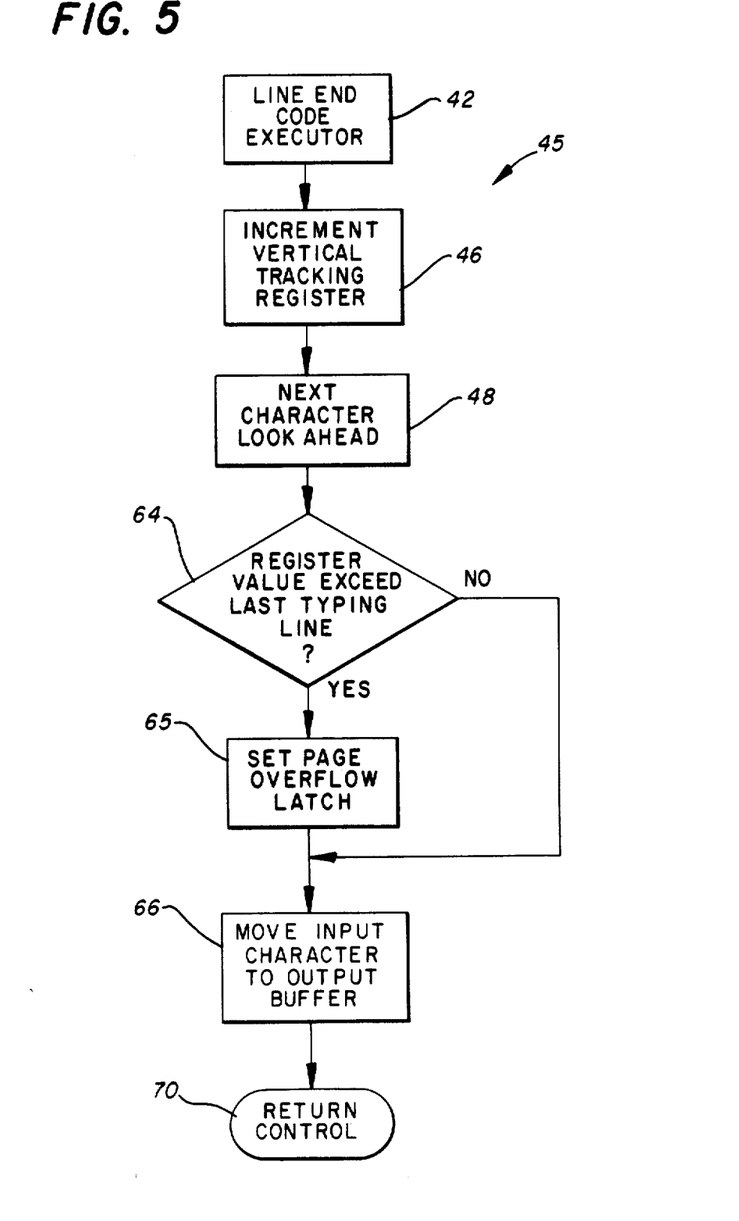
FIG. 5 is a flow chart of the logic of the Automatic Pagination Routine.

When a line end control code is encountered in the data stream, decoder 40 transfers control to line end code executor 42, a subroutine for the Automatic Pagination Routine 45 shown in FIG. 5. Whenever a line end code is executed by executor 42, it causes a vertical displacement of the print position on the page. If, for example, the document is being single spaced with normal line density of six lines per inch, the execution of a line end code causes a vertical displacement of the print position by one sixth of an inch. The current typing line is tracked by a vertical tracking register. The vertical tracking register is thus incremented at step 46 by one sixth of an inch so that it always keeps track of the vertical print position. In general, the vertical tracking register will be incremented by a value depending upon the line density specified by the operator.

Figure 6:
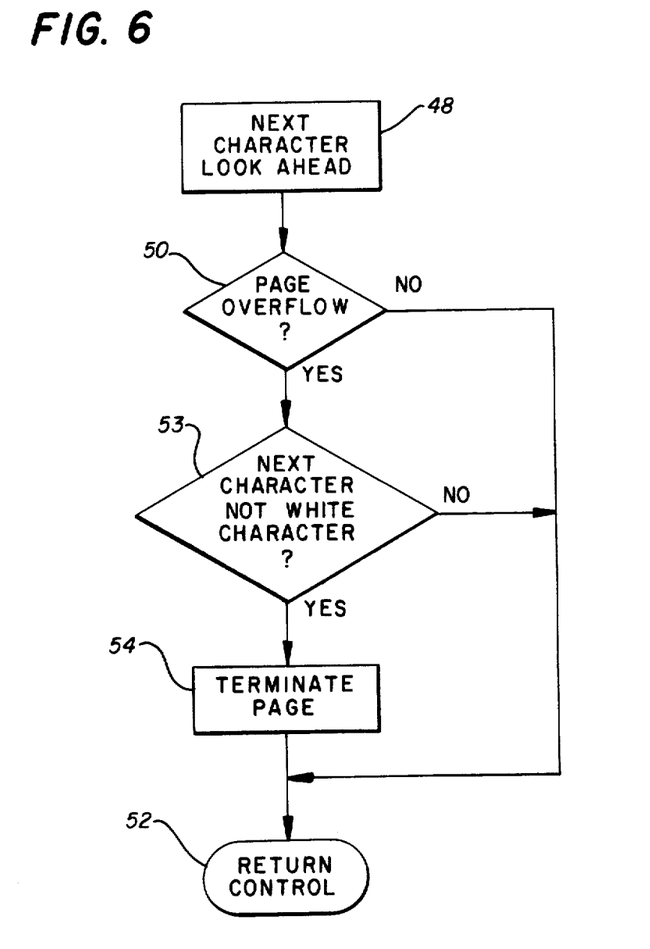
FIG. 6 is a flow chart of the logic of the Next Character Look Ahead Subroutine.

After the vertical tracking register has been incremented at step 46, control is passed to the Next Character Look Ahead Subroutine 48. FIG. 6 shows the logic of the Next Character Look Ahead Subroutine 48. Essentially this subroutine makes a check of the page overflow latch, which may have been set when a previous line end code was encountered. Referring to FIG. 6, the Next Character Look Ahead Subroutine checks for page overflow at 50 by interrogating the page overflow latch 34. If latch 34 has not been set, no page overflow condition exists and the control is returned to the Automatic Pagination Routine 45 (FIG. 5) at step 52. If a page overflow condition is found to exist, a determination is made at step 53 whether the overflow is an error condition, characterized by the presence of a nonwhite or graphic character, by looking at the next character stored in the input buffer 30. If a white character is present, no error condition is detected and pagination is not required at this point in the data stream. Control is then returned to the Automatic Pagination Routine 45 at step 52. If the next character is a graphic character, this error condition is detected and appropriate action is taken by the Terminate Page Subroutine 54.

Figures 7, 8:
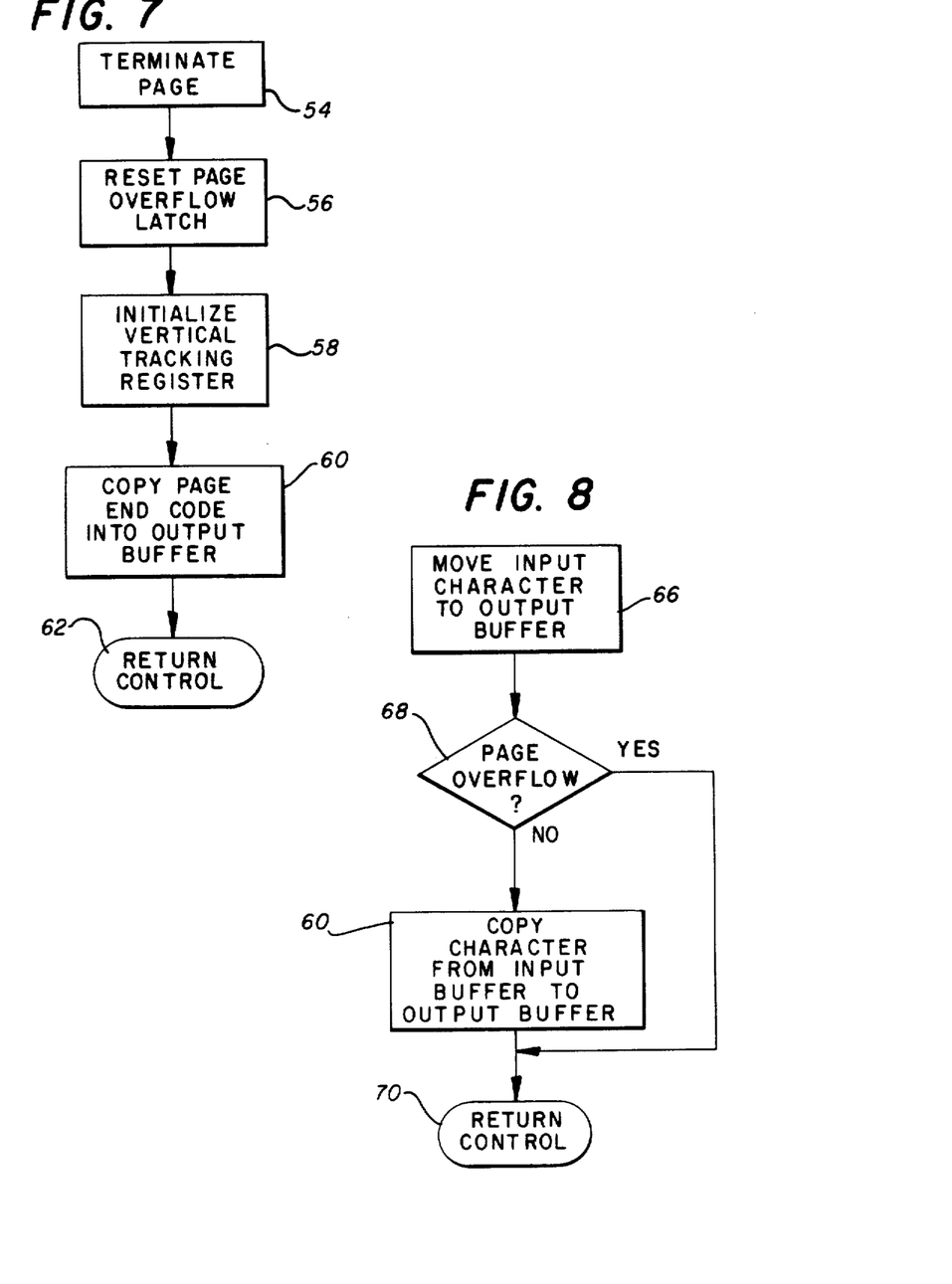
FIG. 7 is a flow chart of the logic of the Terminate Page Subroutine.
FIG. 8 is a flow chart of the logic of the Move Input Character to Output Buffer Subroutine.

FIG. 7 illustrates the logic of Terminate Page Subroutine 54. At step 56, the page overflow latch 34 is reset. The vertical tracking register is then initialized at step 58 to track the vertical print position on a new page. The tracking register is initialized to a value which corresponds to the vertical displacement of the first line at which the new page is to be printed. This first line value is specified by the operator. At step 60, a page end code is then copied into the output buffer 32 following the last character which caused a page overflow and error conditions. Control is then returned to Automatic Pagination Routine 45 (FIG. 5) at step 62.

Referring once again to FIG. 5, a determination is made at step 64 whether the value of the vertical tracking register exceeds the last typing line value specified by the operator. If the last typing line value has not been exceeded, the Move Input Character to Output Buffer Subroutine 66 is executed. If the register value exceeds the last typing line value, an overflow condition exists, which is indicated at step 65 by setting the page overflow latch 34. After latch 34 is set, the Move Input Character to Output Buffer Subroutine 66 is executed.

FIG. 8 shows the logic of Subroutine 66. Essentially this subroutine permits input characters to be transferred to the output buffer if no overflow condition exists. At step 68, a determination is made whether a page overflow condition exists by sampling the page overflow latch 34. If overflow has occurred, control is returned to the Automatic Pagination Routine 45 (FIG. 5) at step 70. Under overflow conditions, a white input character is thrown away by simply providing no mechanism for copying it into the output buffer. Under overflow-error conditions, a graphic input character which represents the first character of a new page will eventually be copied into the output buffer, but this will occur after the latch has been reset, the overflow condition has been terminated and a page end code has been copied into the output buffer ahead of the graphic character. Thus, during processing, a graphic character will be printed on a new page, after a page end code is encountered.

It may thus be seen that the present invention provides automatic pagination for a word processing system. The automatic pagination routine has the ability to handle paginated data streams, as well as data streams containing no page end codes. The revised (paginated) data stream output to the output buffer is then accessed by the print, magnetic card recording and communications access methods, which was not possible in prior art systems.

Whereas the present invention has been described by reference to specific embodiments thereof, it will be understood that various changes and modifications will be suggested to one skilled in the art, and it is intended to encompass such changes and modifications as fall within the scope of the appended claims.

We claim:

1. A method for automatically paginating a data stream of text in a word processing system having a printer for creating a hard copy printout, comprising the steps of:
   formatting said data stream into logical pages in a memory, each logical page defined by a first and last typing line and having a plurality of line end codes;
   initializing a vertical tracking register for a first typing line of a logical page to be printed by said printer on a hard copy page;
   incrementing the vertical tracking register by a value representing a vertical displacement of a vertical print position of the printer when a line end code is encountered in the data stream;
   when said line end code is encountered in the data stream, interrogating a page overflow latch to determine whether a page overflow condition is pending, the pending page overflow condition indicating that the vertical tracking register has reached a predetermined value corresponding to a last typing line of a logical page;
   when a page overflow condition is pending, interrogating the next character in the data stream following the line end code to determine whether said next character is a graphic character;
   when the next character is a graphic character, copying a page end code into an output buffer ahead of said graphic character to indicate a page overflow condition, the completion of a hard copy page, and that printing of the data stream should continue on a next hard copy page; and
   when said next character is a nongraphic character, indicating in the output buffer that the page overflow condition remains pending until the next graphic character is reached.

2. The method of claim 1 further comprising the step of:
   repeating the above steps when the next line end code is encountered in the data stream.

3. A method for automatically paginating a data stream of text in a word processing system having a printer for creating a hard copy printout, comprising the steps of:
   formatting said data stream into logical pages in a memory, each logical page defined by a first and last typing line and having a plurality of line end codes;
   initializing a vertical tracking register for a first typing line of a logical page to be printed by said printer on a hard copy page;
   incrementing the vertical tracking register by a value representing the vertical displacement of a vertical print position of the printer when a line end code is encountered in the data stream;
   when said line end code is encountered in the data stream, interrogating a page overflow latch to determine whether a page overflow condition is pending, the pending page overflow condition indicating that the vertical tracking register has reached a predetermined value corresponding to a last typing line of a logical page;
   when a page overflow condition is pending, interrogating the next character in the data stream following the line end code to determine whether said next character is a graphic character;
   when the next character is a graphic character, copying a page end code into an output buffer ahead of said graphic character to indicate a page overflow condition, the completion of a hard copy page, and that printing of the data stream should continue on a next hard copy page;
   when said next character is a nongraphic character, indicating in the output buffer that the page overflow condition remains pending until the next graphic character is reached;
   when the next character is a graphic character, resetting said page overflow latch;
   interrogating said page overflow latch a second time to determine whether a page overflow condition is pending; and when a page overflow condition is not pending, copying the graphic character into the output buffer.

4. The method of claim 3 further comprising the step of:
   repeating the above steps when the next line end code is encountered in the data stream.

5. The method of claim 3 further comprising the step of:
   initializing said vertical tracking register when the next character is a graphic character.

6. The method of claim 5 wherein said vertical tracking register is initialized to a value equal to the vertical displacement of the first typing line specified by the operator.

7. The method of claim 3 further comprising the steps of:
   interrogating said vertical tracking register to determine whether the value of said register exceeds the predetermined last typing line value as specified by the operator; and
   when the value exceeds the last typing line value, setting said page overflow latch.

8. A method for automatically paginating a data stream of text in a word processing system having a printer for creating a hard copy printout, comprising the steps of:
   formatting said data stream into logical pages in a memory, each logical page defined by a first and last typing line and having a plurality of line end codes;
   initializing a vertical tracking register for a first typing line of a logical page to be printed by said printer on a hard copy page;
   incrementing the vertical tracking register by a value representing the displacement of a vertical print position of the printer when a line end code is encountered in the data stream;
   when the line end code is encountered in the data stream, interrogating a page overflow latch to determine whether a page overflow condition is pending, the pending page overflow condition indicating that the vertical tracking register has reached a predetermined value corresponding to a last typing line of a logical page;
   when a page overflow condition is pending, interrogating the next character in the data stream following the line end code to determine whether said character is a graphic character;
   when the next character is a graphic character, resetting said page overflow latch;
   when the next character is a graphic character, initializing said vertical tracking register to a value equal to the vertical displacement of the first typing line of the logical page;
   when the next character is a graphic character, copying a page end code into an output buffer ahead of said graphic character to indicate a page overflow condition, the completion of a hard copy page, and that printing of the data stream should continue on a next hard copy page;
   when said next character is a nongraphic character, indicating in the output buffer that the page overflow condition remains pending until the next graphic character is reached;
   interrogating said vertical tracking register to determine whether the value of said register exceeds the predetermined last typing line of the logical page;
   when the value exceeds the last typing line, setting said page overflow latch;
   interrogating said page overflow latch a second time to determine whether a page overflow condition is pending; and
   when a page overflow condition is not pending, copying the graphic character into the output buffer.

9. The method of claim 8 further comprising the step of:
   repeating the above steps when the next line end code is detected.

10. The method of claim 8 further comprising the step of:
    resetting said page overflow latch when a page end code is encountered in the data stream.

* * * * *